United States Patent [19]

Heiland

[11] Patent Number: 4,941,265
[45] Date of Patent: Jul. 17, 1990

[54] APPARATUS FOR PREVENTING CHANGES OF THE POSITIONS OF MACHINES

[75] Inventor: Klaus-Peter Heiland, Raunheim, Fed. Rep. of Germany

[73] Assignee: Barry Controls GmbH, Raunheim, Fed. Rep. of Germany

[21] Appl. No.: 218,650

[22] Filed: Jul. 13, 1988

[30] Foreign Application Priority Data

Jul. 16, 1987 [DE] Fed. Rep. of Germany ....... 3723466

[51] Int. Cl.$^5$ .......................... G01B 5/03; G01B 21/00
[52] U.S. Cl. ......................................... 33/504; 33/503; 33/1 M; 33/568
[58] Field of Search .................. 33/503, 504, 559, 568, 33/573, 1 M; 73/664, 665; 248/638, 653, 654, 649

[56] References Cited

U.S. PATENT DOCUMENTS

| | | | |
|---|---|---|---|
| 3,831,283 | 8/1974 | Pagella et al. | 33/559 |
| 4,525,930 | 7/1985 | Bury | 33/1 M |
| 4,610,089 | 9/1986 | Bell et al. | 33/1 M |
| 4,798,006 | 1/1989 | Barnaby | 33/503 |
| 4,821,205 | 4/1989 | Schutten et al. | 248/638 |

FOREIGN PATENT DOCUMENTS

| | | | |
|---|---|---|---|
| 57-77905 | 5/1982 | Japan | 33/1 M |
| 58-62509 | 4/1983 | Japan | 33/568 |

Primary Examiner—William A. Cuchlinski, Jr.
Assistant Examiner—Patrick R. Scanlon
Attorney, Agent, or Firm—Peter K. Kontler

[57] ABSTRACT

Apparatus for preventing changes of the position of a machine, such as a measuring machine, has several pneumatic bearings which floatingly support the machine and receive signals from a digital computer to ensure timely selection of resistance which must be offered by the bearings to changes of the position of the machine relative to its support while a mobile part of the machine moves relative to the part which is supported by the bearings. Signals which are stored in the memory of the computer are calculated in advance or are obtained as a result of one or more test runs by taking into consideration all parameters which are likely to impart to the bearing-supported part or parts a tendency to change its or their positions. Such parameters include the distance to be covered by the mobile part, the configuration of the path of movement of the mobile part, the velocity of the mobile part, the mass of the mobile part and of the bearing-supported part or parts, the inertia of the bearings and others. The position of the mobile part is monitored at all times, and the corresponding signals are transmitted to the computer or to a discrete signal comparing stage which controls the motor or motors for the mobile part.

9 Claims, 2 Drawing Sheets

APPARATUS FOR PREVENTING CHANGES OF THE POSITIONS OF MACHINES

BACKGROUND OF THE INVENTION

The invention relates to improvements in apparatus for preventing changes of the positions of machines, or of one or more units or parts of machines, especially measuring machines wherein a mobile part or unit is displaceable relative to another unit or part along one or more predetermined paths.

Apparatus of the type to which the present invention pertains can employ bearings which support a first part of the machine and can apply to the first part forces of variable magnitude in order to counteract the tendency of the first part to leave its position as a result of movement of a second part relative to the first part. The bearings can cause the first part to "float" above the floor or above the ground and are adjustable so as to offer a greater or a less pronounced resistance to changes in orientation and/or to other changes in the position of the first part, for example, as a result of movement of the second part relative to the first part whereby the center of gravity of the machine including the first and second parts moves to a different position and the first part tends to change its inclination relative to the floor or ground.

In a presently known apparatus for controlling the position of a machine table which is fixedly installed in the frame of the measuring machine, the position of the table is numerically controlled to thus ensure that movements of a carrier for a measuring instrument relative to a workpiece on the table do not entail a change of position of the table and of the machine frame relative to the floor. The apparatus employs a digital computer which transmits signals for initiation of movements of the carrier and its measuring instrument relative to the table and the workpiece. Reference may be had to the German-language publication "Konstruktion 38" (1986), Volume 4, pages 139–148. U.S. Pat. No. 3,831,283 to Pagella et al. discloses a machine which has a very large mass and is mounted on pneumatic bearings each of which constitutes a cylinder and piston arrangement. Such bearings are intended to prevent the machine from performing movements in response to vibrations of the floor which are caused by neighboring machines, by vehicles which are driven along the floor and/or by attendants walking on the floor. The carrier resembles a gantry and its movements relative to the work-supporting table entail a change of inclination of the table as a result of shifting of the center of gravity of the machine and/or as a result of acceleration forces acting upon the gantry. Such changes in inclination of the table can affect the accuracy of measurement, especially if the measurement must be carried out with minute tolerances in the range of one or more microns.

In order to compensate for changes in the position of the machine table and the workpiece as a result of movements of the gantry and of the measuring instrument relative to the table, the adjusting apparatus of such machine comprises closed loop position control circuits each of which includes one of the bearings. Each circuit ascertains the momentary position of the machine and compares such position with a desired or reference position. If the monitored position deviates from the desired position, the circuit adjusts the respective bearing so as to eliminate the difference between the two positions. A drawback of such adjustment is that unavoidable inertia of the position control circuits prevents the corresponding bearings from immediately reacting to ascertained changes in position of the machine. In other words, the adjustment is too late because it normally takes place after the position control circuit already assumes a steady state condition. In fact, it is even possible that the delayed adjustment of a bearing imparts to the machine a growing vibratory movement, for example, if the adjustment of a bearing is delayed sufficiently to enable the machine to reassume its proper position as a result of further advancement of the gantry with the measuring instrument relative to the table and the workpiece thereon. A proposal to avoid such problems with conventional measuring machines involves a pronounced reduction of speed so that the measurement of a workpiece takes up a relatively long interval of time. The problems are analogous if the table and the workpiece thereon are moved relative to the carrier of the measuring instrument.

Certain other conventional measuring machines are disclosed in German Offenlegungsschrift No. 24 20 928 of Yamaji et al. and in German Offenlegungsschrift No. 25 33 479 of Petersen et al.

OBJECTS OF THE INVENTION

An object of the invention is to provide a machine with novel and improved apparatus for timely prevention of undesirable changes of the position of the machine with reference to the ground, floor or another support.

Another object of the invention is to provide an apparatus which renders it possible to operate the machine at an elevated speed.

A further object of the invention is to provide the apparatus with novel and improved means for timely transmission of adjusting signals to the bearings for the machine.

An additional object of the invention is to provide the apparatus with novel and improved means for controlling the movements of a follower which tracks the outline of a mobile part in the machine.

SUMMARY OF THE INVENTION

In accordance with the invention, the above and other objects are accomplished by the provision of an apparatus which embodies a position control circuit for each of a plurality of fluid-operated bearings on which the machine floats. The bearings receive signals for resisting changes of the position of the machine with requisite force in good time in advance of the need for exertion of the force so that they can offer the necessary resistance to a change of the position of the machine and thus maintain the machine in an optimum position relative to the ground, floor or any other support for the machine.

The signals are indicative of the desired position of the machine for each and every portion of the path of movement of the mobile part or parts of the machine with reference to the part or parts which are mounted on and/or between the bearings. The arrangement is such that the signals which are to be transmitted to the bearings for each portion of the path or paths of the mobile machine part or parts are determined in advance and are stored for timely transmission to the bearings, namely for transmission at instants which precede the actual application of a required force by an interval corresponding to the sum of movements of movable elements of the bearings and of the mobile part or parts of the machine from the instant of transmission of a signal to the instant when the mobile part or parts of the machine reach the corresponding portion or portions of its or path or paths. This ensures that the bearings offer to changes of the position of the machine a resistance which suffices to maintain the machine in the prescribed position because the signals for selection of forces which the bearings must apply in order to prevent the machine from changing its position are transmitted in good time before the mobile part or parts of the machine reach the corresponding portion or portions of its or their prescribed path or paths. In other words, the bearings generate forces which match and oppose the forces tending to change the position of the machine, and the generation of such opposing forces takes place at least substantially simultaneously with the generation of forces which tend to change the position of the machine.

The required opposing forces can be determined in the course of a test run or they can be calculated in advance, and the corresponding signals can be stored, for example, in a digital memory which is addressed in synchronism with the start of movement of the mobile part or parts of the machine so that appropriate signals can be transmitted from the memory to the bearings. This renders it possible to move the mobile part or parts of the machine at an elevated speed without risking that the position of the machine will change or that the position of the machine will change beyond an acceptable range.

The apparatus for which protection is sought in the appended claims is designed to prevent changes of the position of a machine wherein a first part supports a mobile second part and the first part is subject to the action of variable forces tending to change the position of the first part in response to movement of the second part. The apparatus comprises adjustable bearings for the first part, such bearings serving to offer a variable resistance to changes of the position of the first part of the machine, and the apparatus further comprises means for adjusting the bearings so as to vary their resistance in good time to enable the bearings to counteract and neutralize the variable forces during each stage of movement of the mobile part relative to the first part of the machine.

The adjusting means can include a memory for signals denoting the desired position of the mobile part relative to the first part during each stage of movement of the mobile part with reference to the first part, and means for transmitting from the memory to the bearings signals pertaining to various stages of movement of the mobile part before the mobile part reaches the respective stages so as to enable the bearings to offer appropriate resistance to changes in the position of the first part when the mobile part reaches the respective stages of its movement relative to the first part. The signal transmitting means can include means for transmitting to the bearings signals before the mobile part reaches the respective stages of its movement and in good time to account for the intervals of adjustment of the bearings and for movement of the mobile part so as to reach the respective stages of its movement.

The improved apparatus can be designed to prevent changes of the position of a measuring or material removing machine wherein the first part includes a table or an analogous support for a workpiece and the mobile part includes a carrier for a measuring instrument or a material removing tool which tracks the workpiece in response to movement of the mobile part along at least one predetermined path. The adjusting means of the apparatus for use in conjunction with such machine can comprise a position regulating arrangement having a digital computer which includes the aforementioned memory and can be programmed in response to signals from a punched tape, from a keyboard or from other signal supplying means.

The just described apparatus for use in the measuring or material removing machine can further comprise means for moving the carrier in accordance with a predetermined program which is stored in the computer and means for monitoring the position of the carrier during movement of the carrier along its path and for generating second signals which denote the position of the carrier during various stages of its movement relative to the table, and means for influencing the movement of the carrier when the monitored position of the carrier deviates from the programmed position.

At least one of the bearings can include or constitute a fluid-operated bearing, particularly a pneumatic bearing. Such bearing can include a cylinder member for a supply of gaseous fluid and a piston member. One of these members serves to offer the aforementioned resistance to changes of the position of the first part of the machine, and such resistance is variable in response to changes of pressure of the supply of gaseous fluid in the cylinder member. The adjusting means for such one bearing includes means for changing the pressure of fluid in the cylinder member. The pressure changing means can comprise at least one plunger which is movable relative to the cylinder member in response to signals from the memory and extends into the supply of gaseous fluid in the cylinder member. Alternatively, the means for changing the pressure of gaseous fluid in the cylinder member can include a source of pressurized fluid, an adjustable valve between the source and the cylinder member, and means (e.g., a solenoid) for adjusting the valve in response to signals from the memory so as to vary the rate of admission of pressurized fluid from the source into the cylinder member or the rate of evacuation of fluid from the cylinder member.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
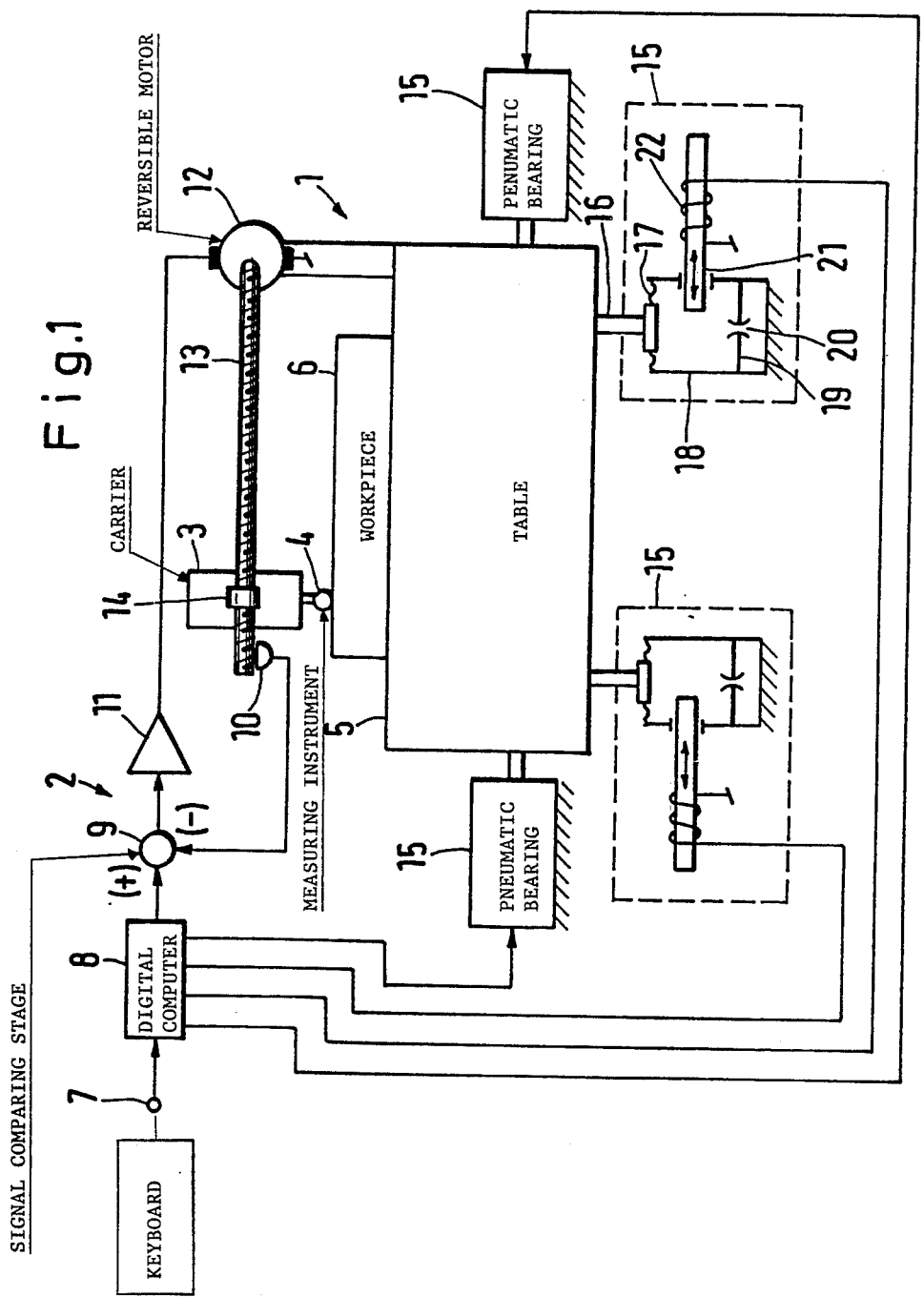
FIG. 1 is a schematic elevational view of a measuring machine and of an apparatus which embodies one form of the invention.

FIG. 1 shows a measuring machine 1 which has a large mass and is provided with a numerically controlled position regulating arrangement 2 for a carrier 3 which supports a measuring instrument or head 4. The purpose of the measuring instrument 4 is to ascertain the dimensions of an object 6 which rests on a support 5 constituting a table or base of the measuring machine 1 and being firmly installed in or being integral with the frame of the measuring machine 1. The exact manner in which the object 6 (e.g., a workpiece) is separably mounted on the table 5 forms no part of the invention. The regulating arrangement 2 has means for moving the measuring instrument 4 relative to the object 6 on the table 5, i.e., for moving the element 4 along the exposed surface or surfaces of the object 6, preferably in a plurality of directions and in accordance with a predetermined program as will be described below. The program is transmitted by way of an input 7 to a digital computer 8. Such program can be supplied by a magnetic tape or by a punched tape which is monitored by a suitable reader serving to transmit signals to the input 7. Alternatively, the input 7 can receive signals directly from a keyboard in a manner well known from the art of signal transmission to the inputs of digital computers. The program includes starting and final values as well as information denoting straight or arcuate sections (if any) of the monitored surface along which the measuring instrument 4 is to move in the course of the measuring or monitoring operation. Still further, the program which is to be transmitted to the input 7 can contain information which determines the speed at which the carrier 3 of the measuring instrument 4 is to move relative to the workpiece 6.

The digital computer 8 evaluates the information which is transmitted to the input 7 and transmits to a signal comparing stage 9 signals which are indicative of the desired position of the measuring instrument 4 during various stages of the measuring or monitoring operation. The sequence of signals which are transmitted to the comparing stage 9 is commensurate with the selected speed of movement of the measuring instrument 4 and its carrier 3 along the respective surface of the object 6.

The structure which is shown in FIG. 1 further comprises a detector 10 which monitors the position of the carrier 3 relative to the workpiece 6 and transmits corresponding signals to the comparing stage 9 wherein such signals are compared with those which are transmitted to the stage 9 by the corresponding output of the computer 8. If the signals from the computer 8 to the stage 9 deviate from those which the stage 9 receives from the detector 10, the stage 9 transmits adjusting signals to an amplifier 11 which, in turn, transmits amplified signals to a reversible motor 12 serving to rotate a feed screw 13 constituting a means for changing the position of the carrier 3 relative to the table 5 and the workpiece 6. The carrier 3 includes or is connected with a nut 14 which mates with the feed screw 13. The stage 9 can transmit positive or negative signals so that the feed screw 13 can move the carrier 3 in a direction to the right or to the left, as viewed in FIG. 1. The movement of the carriage 3 relative to the table 5 and the workpiece 6 is terminated when the position of the carriage matches the prescribed position as determined by the corresponding signal from the computer 8. The detector 10 is designed to monitor the angular position of the feed screw 13 as an indication of the position of carrier 3 and measuring instrument 4 relative to the workpiece 6.

For the sake of simplicity, FIG. 1 merely shows a single-coordinate position regulating arrangement 2 for the carrier 3. In actual practice, the carrier 3 is normally adjustable in three different directions, preferably in the directions of the X-, Y- and Z-axes at right angles to each other. The circuitry for effecting the adjustments along the two coordinates which are not shown in FIG. 1 is or can be identical with the illustrated circuitry. It is preferred to employ a single digital computer 8 as a source of signals for adjustments along all three coordinates; the computer 8 cyclically switches from adjustment along one coordinate to adjustments along the other two coordinates in response to signals from the corresponding outputs of the digital computer 8 in such a way that the position of the measuring machine 1 relative to the floor or ground remains unchanged independently of the nature and/or extent of movement of the carrier 3 relative to the table 5 and object 6.

FIG. 1 shows only four bearings 15 for the table 5. Two of these bearings are located beneath the table 5 and the other two bearings are disposed at opposite vertical sides of the table. As a rule, or at least in many instances, the underside of the table 5 will rest on at least three properly distributed bearings 15 which act vertically upwardly to oppose downward movements of the machine, and such bearings are staggered relative to each other so that they are not located in a common vertical plane. The number of laterally disposed bearings 15 will be selected with a view to ensure that the bearings acting in a horizontal direction will be capable of maintaining the table 5 in a desired position with the required static reliability.

Each bearing 15 comprises a piston 16 which abuts the table 5 and is connected with a membrane 17 at the respective end of a cylinder 18 which contains a supply of entrapped fluid and further contains a partition 19 with a preferably adjustable flow restrictor 20. The fluid medium in the cylinder 18 is preferably compressed air or another gaseous fluid. The partition 19 divides the interior of the cylinder 18 into two chambers which can communicate by way of the respective flow restrictor 21.

Each bearing 15 further comprises a second piston 21 (hereinafter called plunger) which can be said to constitute the output element of an adjusting unit receiving signals from the computer 8 and serving to select the resistance which the piston 16 offers to depression into the respective cylinder 18 by the table 5. Signals which are transmitted from the computer 8 are preferably amplified by a suitable power amplifier (not shown), and such signals are used to change the pressure of fluid in the cylinder 18 by changing the extent to which the plunger 21 extends into the chamber between the membrane 17 and the partition 19. The plunger 21 sealingly extends through the respective wall of the cylinder 18 and its position relative to the cylinder 18 determines the resistance which the piston 16 offers a displacement of the table 5 toward the respective cylinder 18. Each adjusting unit further comprises a coil 22 through which the plunger 21 extends and which is in circuit with the respective output of the computer 8. The coil 22 can be replaced with other means for changing the position of the plunger 21 in response to signals from the computer 8. For example, signals from the computer 8 can control a linear motor which includes a rack and pinion drive. The rack can be provided on the plunger 21 and the pinion is rotatable clockwise or counterclockwise by a reversible motor which receives signals from the computer 8.

The computer 8 has a memory which stores signals denoting all necessary parameters for calculation of the intensity and (positive or negative) sign as well as the timing of pulses which are transmitted to the coils 22.

The parameters denote the extent and direction as well as the speed of movement of the carrier 3 relative to the object 6 on the table 5. The arrangement is such that the bearings 15 jointly offer a resistance which is required to hold the table 5 in a selected position relative to the floor, ground or other suitable support irrespective of the speed and/or direction of movement of the carrier 3 and measuring instrument 4 relative to the workpiece 6 and table 5. For example, if the measuring instrument 4 is moved to the right (as seen in FIG. 1) so as to monitor the upper side of the object 6, the stress upon the piston 16 of the lower left-hand bearing 15 in FIG. 1 is relaxed whereas the piston 16 of the lower righthand bearing 15 undergoes additional stressing. This imparts to the table 5 a tendency to change its inclination, i.e., to slope downwardly and to the right. Moreover, when the carrier 3 is accelerated or decelerated, i.e., when the velocity of the measuring instrument 4 changes in a horizontal plane, the table 5 is acted upon by horizontal forces and exhibits a tendency to change its inclination with reference to the horizontal. The exact magnitude of forces acting upon the table 5 during each stage of monitoring of the workpiece 6 can be calculated in advance, i.e., the computer 8 can furnish information which denotes the magnitude of resistance which must be exerted by the bearings 15 in order to prevent any noticeable displacement of the table 5 from the desired position. This can be ascertained by the computer 8 on the basis of information which is supplied by the input 7, which is ascertained by the computer 8 and denotes the desired position of the table 5, as well as on the basis of moving or non-moving masses, such as the mass of the carrier 3, object 6 and table 5. Still further, the computer 8 takes into consideration changes of velocity of the carrier 3 by monitoring the positions of the carrier 3 according to the direction and extent during successive stages of the monitoring operation. Thus, the computer 8 is designed (programmed or wired) in such a way that it calculates, for each bearing 15, the resistance which the pistons 16 must offer in order to successfully oppose a movement of the table 5 in the respective direction, and such calculations are made on the basis of desired positions of the carrier 3 at different stages of the monitoring or measuring operation and on the basis of information which is stored in the memory of the computer 8. The memory of the computer 8 further contains information as to the transfer function of each bearing 15. The bearings 15 receive signals in good time so that they offer the required resistance at the exact instants, or very close to the exact instants, when their pistons 16 are acted upon by forces which tend to displace the table 5 from its prescribed position. The bearings 15 neutralize such forces at the very instants when the forces develop, i.e., the neutralizing action takes place whenever and as long as the carrier 3 is in motion, and the compensation is complete because it accounts for the direction as well as for the magnitude and timing of forces which tend to displace the table 5 from the prescribed position. It has been found that the table 5 retains its proper position even if the carrier 3 is rapidly accelerated or decelerated as well as if the carrier 3 is caused to advance at an elevated speed. Rapid acceleration is desirable and advantageous because the dimensions of the object 6 on the table 5 can be ascertained within a shorter interval of time.

The bearings 15 receive signals in advance of the instants when the bearings must offer adequate resistance in order to prevent the machine 1 from changing its position relative to the ground, floor or another support. The transmission of appropriate signals to the coils 22 precedes the instants when the plungers 21 must assume predetermined positions relative to the respective cylinders 18 by intervals equaling the sum of the times of movements of the plungers 21 and the time of movement of the carrier 3 to corresponding positions relative to the workpiece 6, i.e., the bearings 15 have ample time to select the resistance which is needed to effectively oppose movements of the machine 1 from the desired position during each stage of movement of the carrier 3 and measuring instrument 4 relative to the table 5 and workpiece 6.

As mentioned above, the information which is stored in the memory of the computer 8 can be obtained during one or more test runs or by calculation. The parameters which must be taken into consideration include the speed of movement of the carrier 3, the direction of its movement, the position of the center of gravity of the machine 1 during each stage of movement of the carrier 3, the mass of the machine 1, the mass of the moving parts (3 and 4), the inertia of the position regulating arrangement, the intervals of time which elapse during movement of the measuring instrument 4 through unit distances along the prescribed path, the intervals of time which are necessary to shift the plungers 21 relative to the respective cylinders 18 to a plurality of different positions in each of which the corresponding bearing 15 offers a given resistance to a change of the position of the machine 1, and others. The memory of the computer 8 can further store information denoting the overall length of the path of movement of the measuring instrument 4, the velocity of such movement, the influence of the nature of the path (straight or arcuate) of movement of the instrument 4 upon other variables, the influence of acceleration forces acting on the carrier 3 and/or instrument 4 upon the table 5 and the workpiece 6 thereon. Such information is stored for each and every increment of movement of the carrier 3 relative to the table 5 and is used to ensure timely adjustment of the bearings 15 so that each bearing offers the required resistance to a change of the position of the machine 1 at the exact instant when a particular resistance is necessary in order to avoid a horizontal and/or other change of position of the machine 1. The adjustment of bearings 15 takes place in time even when the carrier 3 is caused to move at an elevated speed so that the measurement of the workpiece 6 can be completed within a fraction of the time which is necessary in the aforediscussed conventional measuring machines. The fact that the carrier 3 moves at an elevated speed does not adversely affect the accuracy of adjustment of the bearings 15.

By way of example, if the measuring instrument 4 is to move linearly or otherwise along a horizontal path between points A and B along the upper side of the workpiece 6 on the table 5, the memory of the computer already contains all information (supplied at 7, e.g., from a keyboard) including the coordinates of the points A and B as well as the velocity of the instrument 4 during movement between such points so that the computer is in a position to calculate by linear interpolation the coordinates of each and every point between the points A and B, i.e., during each stage of movement of the instrument 4 from A to B. The corresponding information is furnished to the comparator 9 in the form of signals which denote the desired positions of the instrument 4 during each of closely or immediately adjacent stages of advancement along the upper side of the workpiece 6. The frequency at which the comparator 9 receives signals from the memory of the computer 8 is related to the speed of movement of the carrier 3 under the action of the feed screw 13 and motor 12. Thus, the computer 8 knows in advance when the carrier 3 reaches a particular stage of movement from A to B and, therefore, the computer is in a position to transmit timely signals to the adjusting means or units 21, 22 of the bearings 15 in order to ensure that each bearing 15 can offer appropriate resistance to the tendency of the table 5 to change it position when the carrier 3 reaches the corresponding portion of its path. The information which is stored in the computer 8 further incudes data denoting the spring characteristics of the bearings 15, the locus of the center of gravity of the machine 1 during each stage of movement of the carrier 3, the mass of the table 5, the inertia of the bearings 15 and of the adjusting means therefor, the mass of the carrier 3 and the instrument 4, and the extent to which the plungers 21 must be shifted relative to the associated cylinders 18 in order to enable the pistons 16 to offer the required resistance to displacement of the table 5 in directions to depress the respective pistons. Still further, the computer 8 stores information which indicates the reaction time of the bearings in response to the application of different forces by the table 5. If the position of the table 5 changes, such change is eliminated by the corresponding bearing or bearings 15 at the time it develops in view of the aforediscussed timely transmission of signals for adjustment of the bearings 15.

Pneumatic bearings are preferred at this time because their characteristic frequency is low, and this enables such bearings to passively isolate the machine from mechanical stray vibratory movements while simultaneously permitting an adjustment of fluid pressure (and hence the selection of appropriate resistance to movements of the machine 1) in a simple and efficient manner.

Figure 2:
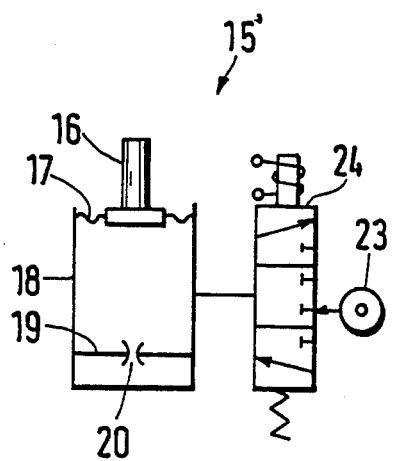
FIG. 2 is a schematic elevational view of a modified bearing which can be used in the machine of FIG. 1.

FIG. 2 shows a modified bearing 15' wherein the second piston (plunger) 21 is replaced with a solenoid-operated valve 24 which controls the flow of a compressed gaseous fluid medium from a source 23 into the cylinder chamber between the membrane 17 and the partition 19. The valve 24 serves to increase or to bring about a reduction of pressure in the cylinder 18. This is achieved in that one of its ports can discharge fluid medium into the atmosphere in response to appropriate signals from the corresponding output of the computer 8. The valve 24 can constitute a commercially available throttling distributing valve with three ports and two flow restrictors. The solenoid of the valve 24 can receive signals to displace the spool against the opposition of a spring between a desired (e.g., infinite) number of different positions, either to permit escape of gaseous fluid from the cylinder 18 or to admit pressurized fluid from the source 23.

The illustrated valve 23 can be replaced with a magnetically operated 3/3-distributing valve whose operation is regulated by pulse-width modulated signals.

Bearings 15 of the type shown in FIG. 1 are preferred at this time because they can react more rapidly than bearings wherein the flow or outflow of a gaseous fluid is regulated by a valve, such as the valve 24 of FIG. 2. The reason is that inertia of the solenoid of the valve 24 is compounded by the limited velocity of pressurized fluid which flows from the source 23 into the cylinder 18 of the bearing 15'.

Each of the bearings 15, 15' can be said to constitute or to act not unlike a pneumatic spring. Such pneumatic springs can be replaced with adjustable bearings which consist of or contain rubber or a springy metallic material, particularly in combination with one or more hydraulic or pneumatic dampers. The adjusting units for such types of springs can comprise servomotors. Pneumatic springs exhibit the advantage that their characteristic frequency is lower, and this ensures a more satisfactory insulation of the machine against vibration.

The invention can be embodied with equal or with similar advantage in other types of machines, for example, in so-called laser steppers which are used for the making of integrated circuits, or in any other machine with a positioning arrangement.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for preventing changes of the position of a machine wherein a first part supports a mobile second part and the first part is subject to the action of variable forces tending to change the position of the first part in response to movement of the second part, the movement of said second part including a plurality of stages, comprising adjustable bearings for the first part, said bearings being arranged to offer a variable resistance to changes of the position of the first part; and means for adjusting said bearings so as to vary said resistance in time to enable the bearings to counteract and neutralize said variable forces during each stage of movement of the mobile part relative to the first part of the machine, said adjusting means including a memory for storing signals denoting the desired position of the mobile part relative to the first part during each of said stages, and means for transmitting from said memory to said bearings adjustment signals in dependency on signals in said memory, said adjustment signals pertaining to various stages of movement of the mobile part before the mobile part reaches the respective stages so as to enable said bearings to offer appropriate resistance to changes in the position of the first part when the mobile part reaches the respective stages of its movement relative to the first part.

2. The apparatus of claim 1, wherein said signal transmitting means includes means for transmitting to said bearings signals before the mobile part reaches the respective stages of its movement and in good time to account for the intervals of adjustment of the bearings and for movement of the mobile part so as to reach the respective stages of its movement.

3. The apparatus of claim 2 for preventing changes of the position of a measuring machine wherein the first part includes a table for a workpiece and the mobile part includes a carrier and a measuring instrument mounted in said carrier and arranged to track the workpiece on the table in response to movement of the carrier along at least one predetermined path, wherein said adjusting means comprises a position regulating arrangement having a digital computer which includes said memory.

4. The apparatus of claim 3, further comprising means for moving the carrier in accordance with a predetermined program which is stored in said computer, means for monitoring the position of the carrier during movement of the carrier along said path and for generating second signals denoting the position of the carrier during said stages of movement of the mobile part, and means for influencing the movement of the carrier when the monitored position of the carrier deviates from the programmed position.

5. The apparatus of claim 2, wherein at least one of said bearings is a fluid-operated bearing.

6. The apparatus of claim 2, wherein at least one of said bearings is a pneumatic bearing.

7. The apparatus of claim 6, wherein said one bearing includes a cylinder member for a supply of gaseous fluid and a piston member, one of said members being arranged to offer said resistance to changes of the position of the first part of the machine and said resistance being variable in response to changes of pressure of the supply of gaseous fluid, said adjusting means including means for changing the pressure of fluid in the cylinder member.

8. The apparatus of claim 7, wherein said fluid pressure changing means includes a plunger which is movable relative to said cylinder member in response to signals from said memory and extends into the supply of fluid in said cylinder member.

9. The apparatus of claim 7, wherein said fluid pressure changing means includes a source of pressurized fluid, an adjustable valve between said source and said cylinder member, and means for adjusting said valve in response to signals from said memory so as to vary the rate of admission of fluid into and evacuation of fluid from said cylinder member.

* * * * *